Sept. 25, 1945.  C. J. GLASSER  2,385,503
OPTICAL TESTING DEVICE AND METHOD OF TESTING
Original Filed March 20, 1941   3 Sheets-Sheet 1
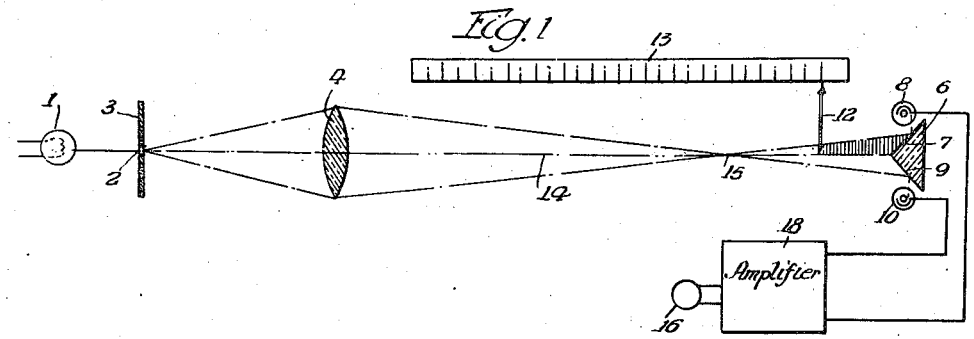
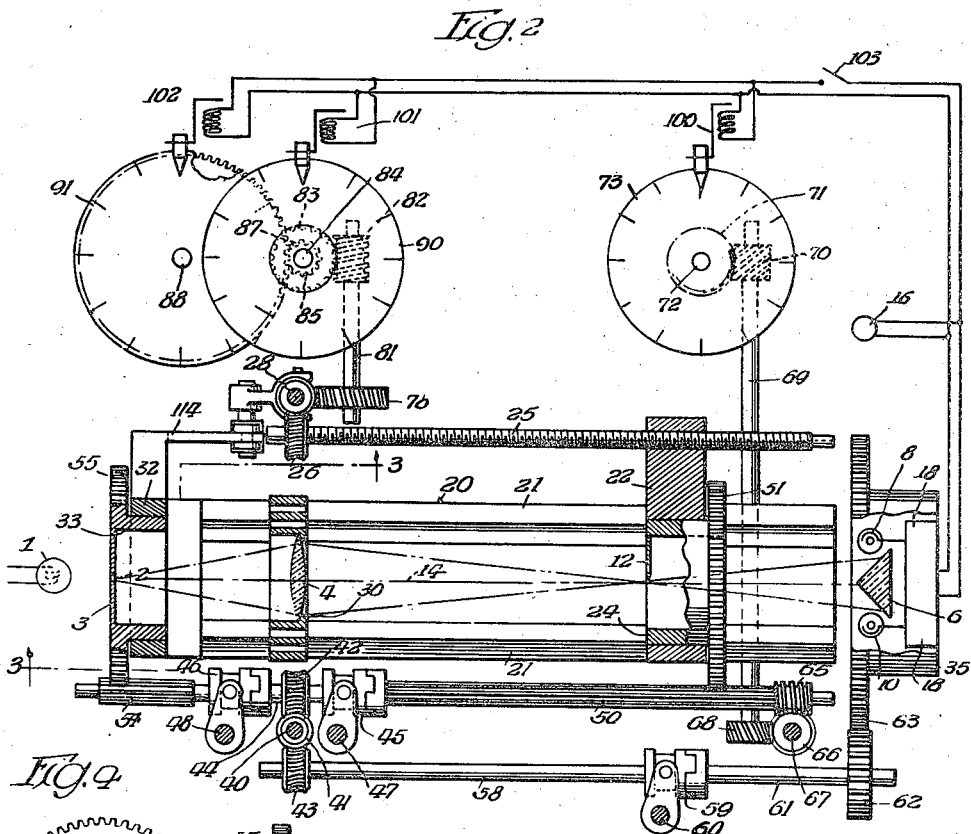
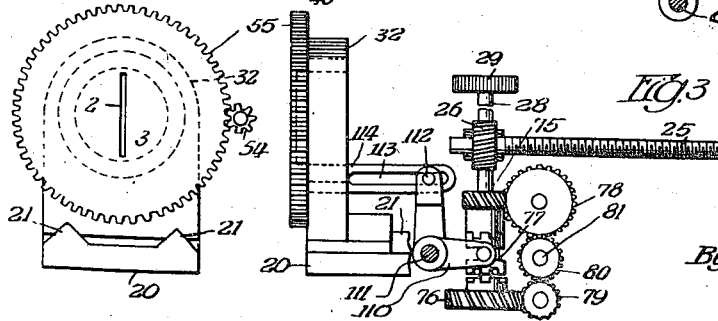
INVENTOR.
Charles J. Glasser Sept. 25, 1945. C. J. GLASSER 2,385,503
OPTICAL TESTING DEVICE AND METHOD OF TESTING
Original Filed March 20, 1941  3 Sheets-Sheet 2
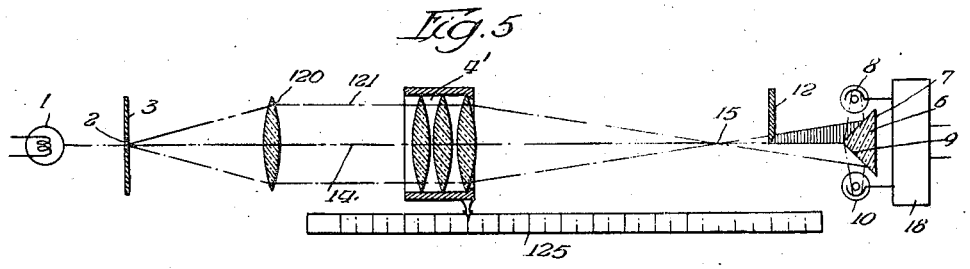
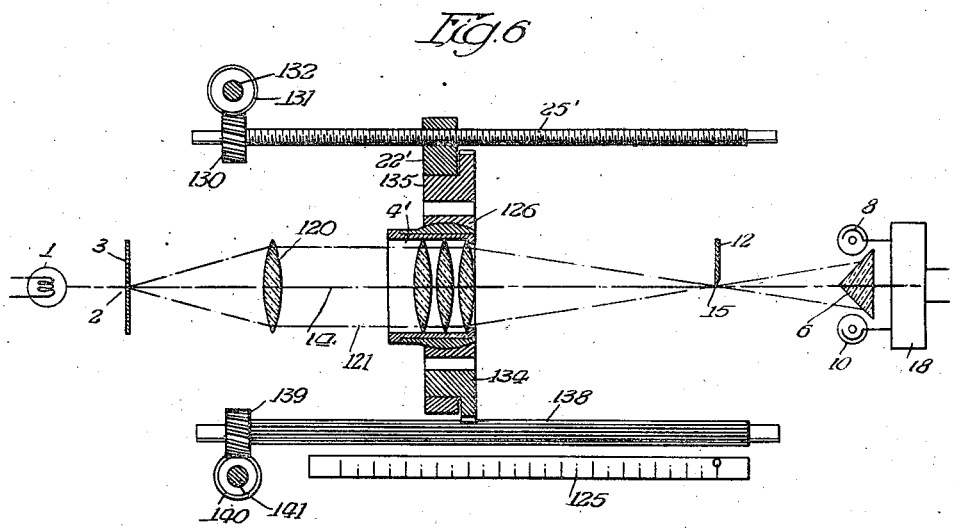
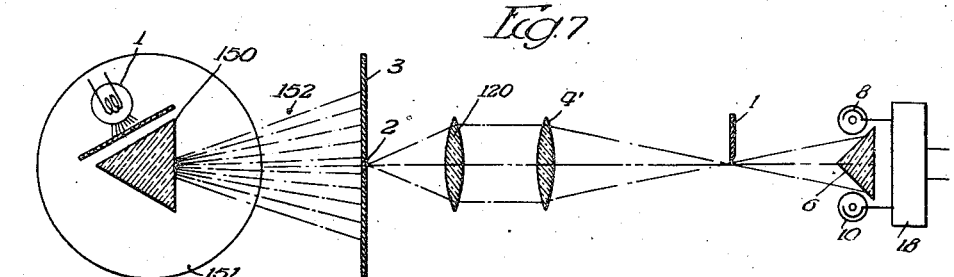
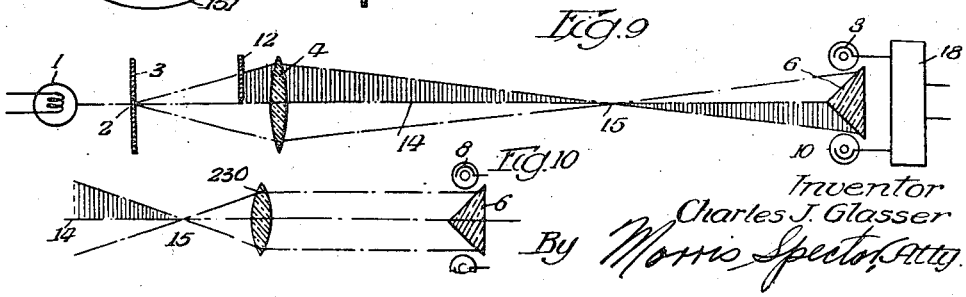
Inventor
Charles J. Glasser
By Morris Spector, Atty.

Sept. 25, 1945.    C. J. GLASSER    2,385,503
OPTICAL TESTING DEVICE AND METHOD OF TESTING
Original Filed March 20, 1941    3 Sheets-Sheet 3
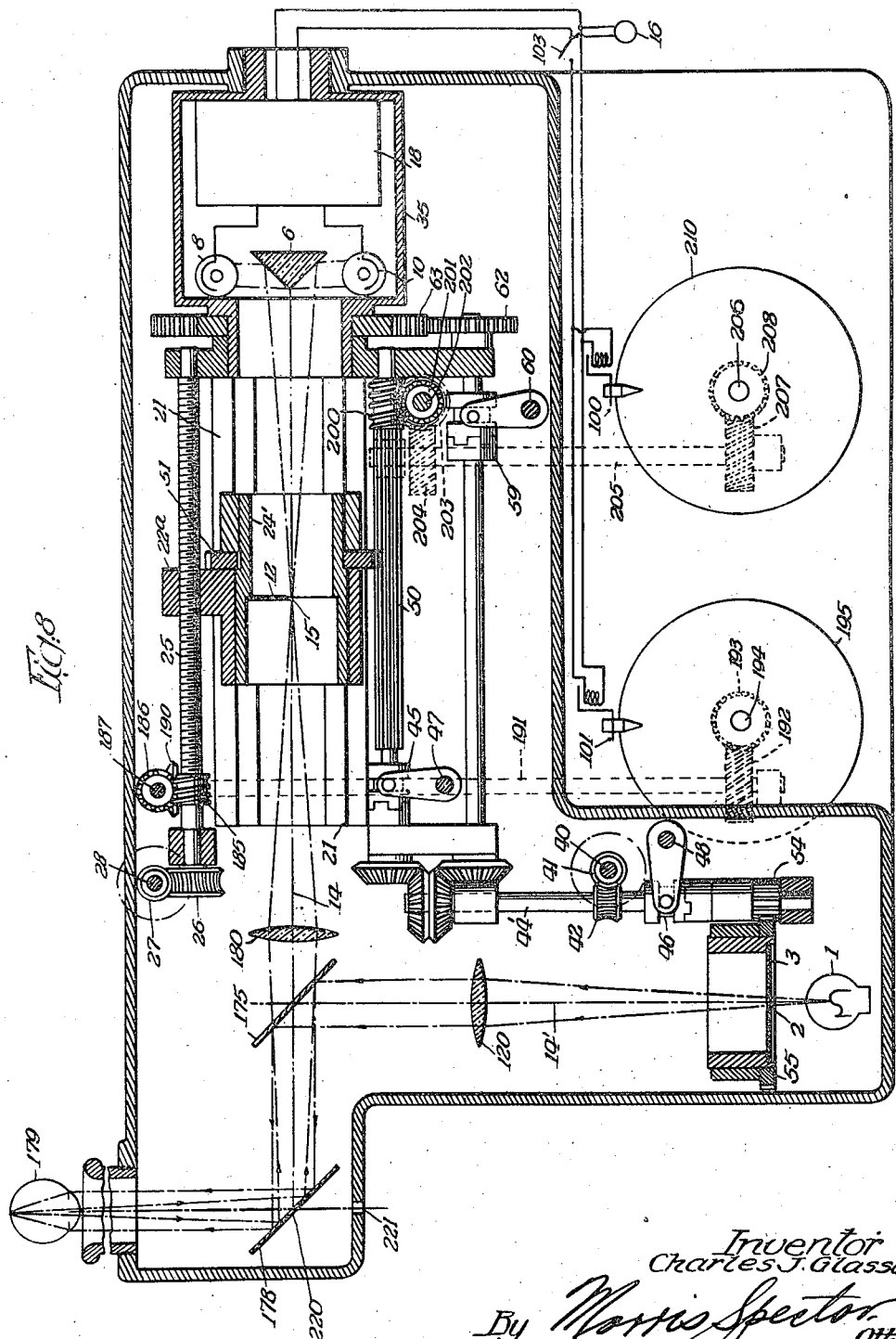
Inventor
Charles J. Glasser
By Morris Spector
Atty Patented Sept. 25, 1945

2,385,503

UNITED STATES PATENT OFFICE 2,385,503

OPTICAL TESTING DEVICE AND METHOD OF TESTING

Charles J. Glasser, Chicago, Ill.

Original application March 20, 1941, Serial No. 384,372. Divided and this application March 17, 1942, Serial No. 435,119

13 Claims. (Cl. 234—1.5)

This application is a division of my co-pending application, Serial No. 384,372, filed March 20, 1941, issued December 15, 1942, as Patent No. 2,304,814.

This invention relates to a method of and means for testing lenses to determine their focal characteristics, and is applicable to individual lenses or combinations of lenses which may be placed in the test apparatus, as well as to such lenses as cannot be placed in the test apparatus, for instance, the lens of the human eye.

In the testing of lenses as, for instance, to determine the focal length of the lens, in accordance with the principles of one embodiment of the present invention, light is directed to a lens under test, and then passed to two photo-electric cells so arranged that one cell receives all of the light on one side of the optical axis of the lens and the other cell receives all of the light on the other side of the optical axis of the lens. The current or potential of those cells is sent or applied to a balancing circuit, the output of which is a function of the difference between the outputs of the two cells (suitable amplifying means being provided). A light cut-off is provided for cutting off the light entering one of the cells, without substantially affecting the light entering the other cell. This cut-off is shifted longitudinally along the optical axis of the lens. So long as the cut-off does not pass the point where the light rays cross the optical axis of the lens the movement of the cut-off produces no relative change in the two light cells. One light cell remains entirely cut off and the other light cell is not at all cut off, and therefore the outputs of the cells remain unbalanced. When, however, the cut-off reaches the cross-over point where the light rays cross the optical axis of the lens the cut-off cuts the light off from neither cell, whereupon a balanced condition of the cells is reestablished. This balanced condition is broken immediately as the cut-off passes the cross-over point. This gives a sharp indication of the cross-over point of the lens, from which the focal length is determined.

Since the light cut-off from one or the other of the two photo cells is zero at the cross-over point and rises to 100% value for one or the other of the cells as the cut-off member moves only a very slight distance from the cross-over point, there is thus obtained a sharp cut-off point indicating when the cross-over point of light from the lens is reached. This sharp cut-off point may be utilized to actuate a relay to mark a graph sheet that moves together with the cut-off and thus indicate on the graph sheet the exact point of cut-off. Thus, if a series of lenses are to be tested the test may be performed by an unskilled operator and the necessary conclusions, for which skill is needed, may be drawn by another person from an examination of the charts thus made. Furthermore, in filling a prescription for eye glasses the lens manufacturer can furnish a chart of the test made upon the glasses furnished to the patient, and the doctor can readily ascertain whether or not the glasses furnished the patient are in accordance with the prescription.

While in the preferred embodiment of the present invention it is desirable to have two light cells arranged in opposition, it is within the purview of the present invention to use only one light cell, by omitting one of the cells. The cell receives approximately half of the light when the cut-off is on one side of the cross-over point of light from the lens, regardless of the precise location of the cut-off, and the cell receives zero per cent of the light when the cut-off is on the opposite side of the cross-over point. Thus the location of the cross-over point is sharply apparent as the electric output of the cell goes from zero to its full value.

It is a further object of the present invention to provide an apparatus and means for testing lenses which is applicable to spherical lenses and also applicable to astigmatic lenses and which can be used to ascertain the axes of astigmatism and to ascertain the focal lengths on the respective axes.

It is a still further object of the present invention to provide a lens testing apparatus the functioning of which will be independent of the degree of luminosity of the light source used. As a result it is possible to use an ordinary electric light source energized from a commercial power system which may be subject to fluctuations and/or surges. The arrangement is such that light from the light source actuates two light responsive cells connected differentially. If the luminosity of the light source increases or decreases it will affect both light cells equally. Hence the system would not be influenced by variations in luminosity of the source whether the variations are due to changes in the light bulb itself or due to electrical surges.

The attainment of the above and further objects of the present invention will be apparent from the following specification taken in conjunction with the accompanying drawings forming a part thereof.

In the drawings:

Figure 1 is a diagrammatic view of an optical system embodying the present invention;

Figure 2 is a horizontal sectional view, partially diagrammatic, of a structure operating on the principles of Figure 1;

Figure 3 is a fragmentary sectional view taken along the line 3—3 of Figure 2;

Figure 4 is an end view of Figure 3;

Figure 5 is a diagrammatic view illustrating another embodiment of the present invention;

Figure 6 is a diagrammatic horizontal sectional view of a structure operating on the principles illustrated in Figure 5;

Figure 7 is a diagrammatic view illustrating still another embodiment of the present invention;

Figure 8 is a horizontal sectional view through a testing apparatus for testing the lens of the human eye;

Figure 9 is a diagrammatic view illustrating another embodiment of the present invention; and Figure 10 is a diagrammatic fragmentary view showing another modification applicable to the other embodiments illustrated.

Reference may now be had more particularly to Figure 1. In this figure a light source, indicated at 1, directs light through a narrow slit or aperture 2 in a plate 3 to a lens 4 which is to be tested. The lens is mounted at a fixed distance from the slit 2 and directs its light to a reflecting prism 6, one surface 7 of which reflects light to an electric light responsive cell 8 and the other surface 9 of which reflects light to an electric light responsive cell 10. A masking screen or cut-off 12 is provided between the reflecting prism 6 and the test lens 4. The cut-off has a knife edge at its lower end which terminates exactly on the optical axis 14 of the test lens 4 or an exceedingly minute distance above the axis 14. The slit 2 and the apex between the prism surfaces 7 and 9 are also on the optical axis 14. The mask 12 is movable between the prism 6 and the lens 4 while maintaining its lower knife edge always on the optical axis 14. When the cut-off is in the position illustrated in full lines in Figure 1 it cuts off substantially all of the light from the lens which would otherwise strike the prism surface 7 but does not affect the light from the lens which strikes the prism surface 9. This condition prevails unaltered so long as the cut-off 12 moves between the prism 6 and the point 15, which is the cross over point where light rays from the lens 4 cross the optical axis 14. At the cross over point the knife edge of the cut-off 12 permits light to pass to both prism surfaces 7 and 9. When the cut-off 12 moves to the left of the cross-over point 15 it cuts off all the light from the lens 4 that would otherwise strike the prism surface 9 and cuts off none of the light from the lens 4 that strikes the surface 7. Thus, for every position of the cut-off 12, other than the position at 15, the cut-off masks out all of the light from only one of the light cells and at the position 15 it masks out the light to neither of the light cells. The position 15, it is apparent, is determinative of the focal point of the lens 4.

The output of the light cells 8 and 10 is delivered to a bridge or differential type amplifier 18. When the two cells receive equal amounts of light the electrical effects of the two cells in the amplifier neutralize one another.

The apparatus is initially adjusted with the cut-off 12 out of position so that the effects of the two light cells 8 and 10 on the amplifier 18 neutralize one another and the output of the amplifier is zero. The cut-off 12 destroys the balance in that the cut-off obstructs the light from one or the other of the two cells. The cut-off is then moved along the optical axis 14. As it moves along the axis it produces no effect upon the amplifier until the cut-off momentarily crosses through the cross-over point 15. At this instant the balance is reestablished and the amplifier output again drops to zero. If the cut-off moves past the cross-over point 15 the balance is immediately again destroyed. The establishment of balance indicates that the cut-off 12 is at the cross-over point 15 of the lens 4. A suitable scale 13 is provided, which is appropriately calibrated, from which the position of the cut-off can be read, thus reading the focal length of the lens 4 directly. The output of the amplifier goes to an electric device 16, which may be a visual or audible signal device, or may be a relay for controlling a recording device, or the like.

If the lens 4 under test is a spherical lens the image of the line slit 2 at the focal point 15 will be a point. Hence the angular position of the cut-off 12 at the point 15 will be immaterial, and the cut-off 12 together with the prism may be rotated about the axis 14 as a center without affecting the balanced condition of the light cells. Also, the cut-off may be rotated independently of the prism without affecting the balanced condition of the light cells. If the lens is, however, astigmatic, then the image of the source of light 2 at the point 15 will be a line, rather than a point, and if the knife edge is rotated with respect to the image, while leaving the prism stationary, the balance will be disturbed. This condition may therefore be utilized to determine whether or not the lens is astigmatic for if the cut-off is rotated at the focal point and the balanced condition is not disturbed then the lens is not astigmatic.

In the description thus far given it was assumed that the lens under test was a spherical lens or, if there is astigmatism, it was assumed that the axis of astigmatism was horizontal, that is, parallel to the knife edge of the cut-off 12. If, however, the axis of astigmatism of the lens 4 happens to be inclined at an unknown angle with respect to the knife edge of the cut-off, then movement of the cut-off along the optical axis of the lens will not produce a change in the condition of balance or unbalance of the system. This indicates that there is astigmatism in the lens and that the axis of astigmatism is at an angle to the knife edge. It is now necessary to ascertain the axis of astigmatism. This result is obtained in the following manner: The cut-off 12 and the prism 6 are rotated with respect to one another about the optical axis 14 as a center until the knife edge of the cut-off is at right angles to the edge of the prism at the intersection of the surfaces 7 and 9. If there is astigmatism in the lens under test a cross section of the beam of light from the lens will be an ellipse whose major and minor axes are at right angles to one another and at an inclination to the horizontal determined by the meridian of astigmatism of the lens. The cut-off 12 intercepts half of the section of the beam. The edge of the prism 6 being at right angles to the edge of the cut-off therefore cuts the remaining half of the beam of light into two quadrants. If the edge of the cut-off 12 happens to be parallel to an axis of the ellipse then the two quadrants into which the non-intercepted half of the beam is divided by the prism will be of equal areas, and the light effects on the two surfaces 7 and 9 of the lens will be the same. If, however, the knife edge 12 cuts the ellipse of light along a line other than one of the axes of the ellipse then the division of the non-intercepted half of the beam by the forward edge of the prism 6 will be into two quadrants of unequal areas. By rotating the knife 12 and the prism 6 together about the axis 14 as a center, the relative areas of these two quadrants is changed. The areas remain unequal until the knife edge comes into a position parallel with one of the axes of the ellipse of light cut thereby. At that time, and only at that time, the areas of the two quadrants of light which strike the surface 7 and 9 of the prism are equal. The cut-off and the prism are then rotated together about the axis 14 as a center. During this rotation the light cells remain unbalanced until the knife edge reaches a position parallel to an axis of astigmatism. In this position the balance is established. Thus as the light cells and the knife edge are rotated together, while they are maintained at right angles to one another, there is a change in the condition of balance between the light cells as the knife edge passes through a position parallel to an axis of astigmatism. One axis of astigmatism of the lens is thus ascertained to be parallel to the knife edge. The prism is then rotated to bring its apex into parallelism with the knife edge of the cut-off (or the cut-off is rotated to bring it into parallelism with the prism edge). The knife edge may then be moved along the optical axis 14, without rotating the knife edge, until it reaches the focal point of the lens at that axis. In that position and only in that position is balance reestablished. This thus indicates the meridian of one axis of astigmatism and the focal length in that axis. The cut-off and the prism are then rotated through exactly 90° and the cut-off 12 is then again shifted along the optical axis 14 to ascertain the focus of the lens in the opposite meridian, at right angles to the first meridian. Thus the focal length and angle of astigmatism of a lens can be found.

Reference may now be had more particularly to Figures 2, 3 and 4, illustrating, diagrammatically, a physical structure for carrying out the principles of the system of Figure 1. The structure includes a base 20 having two upwardly extending parallel inverted V-shaped tracks 21—21 upon which a holder 22 for the cut-off 12 is provided. The holder 22 is slidable along the tracks 21—21. It has a circular opening in which is rotatably mounted a ring 24 that carries the cut-off 12. The cut-off is in the form of a semi-circular disc having a knife edge at the bottom. The holder 22 embraces a lead screw 25 which threads through the holder and is rotatably supported in suitable bearings not shown. Upon rotation of the lead screw 25 the holder 22 is moved in one direction or the other along the tracks 21. The lead screw 25 is rotated by a worm wheel 26 keyed thereto in mesh with a worm on a shaft 28. The shaft 28 is turned by hand, as by a knurled wheel 29.

The lens 4 to be tested is mounted in a holder 30 which may be of any desired construction and which is stationary on the base 20. The plate 3 which has the slit 2, is rotatably mounted in a sleeve 32 that is slidable on the tracks 21 of the base 20. The plate 3 has a ring 33 that fits into the sleeve 32.

The reflecting prism 6 and the light cells 8 and 10 and the amplifier 18 are mounted in a casing 35.

From the description thus far given it is apparent that by operating the shaft 28 the cut-off 12 can be moved along the optical axis 14 until it reaches the cross over point of light rays from the lens 4. At that point, and only at that point, the cut-off does not disturb the light which passes to both cells, and equilibrium is established.

The various parts are rotated by a rotatable shaft 40 that is turned by hand and carries a worm 41 in mesh with worm wheels 42—43. The worm wheel 42 drives a shaft 44 to which is splined a clutch 45 and a clutch 46. The clutch 45 is actuated by a crank on a stud shaft 47, and the clutch 46 is actuated by a crank on a stud shaft 48. The clutch 45 is adapted to engage or disengage the shaft 44 with a pinion shaft 50 which is in mesh with a gear 51 on the cut-off carrying ring 24. The pinion 50 extends the full length of the path of longitudinal travel of the cut-off 12 so that the gear 51 is in mesh with the pinion 50 throughout the length of the longitudinal travel of the cut-off. Upon rotation of the pinion 50 the gear 51 is rotated to rotate the cut-off 12 about the optical axis 14.

The clutch 46 is adapted to engage or disengage the connection between the shaft 44 and a pinion shaft 54 which is in mesh with a spur gear 55 that rotates the slit plate 3. The slit plate 3 is longitudinally slidable for reasons which will be more fully explained hereafter, and for that reason the pinion 54 is elongated.

The worm wheel 43 drives a shaft 58 which, through a clutch 59, actuated by a stud shaft 60, establishes driving connections with a shaft 61 carrying a spur gear 62 in mesh with another spur gear 63 that rotates the casing 35 to rotate the prism 6 and associated light cells 8 and 10. Thus by controlling the clutches and turning the shaft 40 it is possible to rotate the slit 2 or the cut-off 12 or the prism 6, or any combination of the three. The clutch shafts 47, 48 and 60 are manually actuated.

Means is provided for reading the angular and the linear positions of the cut-off 12. To accomplish this the pinion shaft 50 carries a worm 65 that drives a worm wheel 66 which turns a shaft 67. The shaft 67 has a spiral miter gear thereon in mesh with a spiral miter gear 68 which rotates a shaft 69 that carries a miter gear 70 in mesh with a miter gear 71 on a shaft 72 which carries a calibrated disc 73. Thus the disc 73 is rotated together with the cut-off 12. The cut-off 12 has a maximum rotation of 180°. The gear ratio is such that the disc 73 rotates twice as fast as does the cut-off 12.

To ascertain the linear position of the cut-off 12 the shaft 28 is provided with a pair of spiral miter gears 75—76 (Fig. 3) of different sizes, loose on the shaft and arranged so that either one, but not both, may be keyed to the shaft by a clutch 77. The miter gear 75 drives a gear 78, and the miter gear 76 drives a gear 79 both of which are in mesh with a gear 80 that drives a shaft 81. The shaft 81 through a worm 82 and worm wheel 83 drives a shaft 84. The shaft 84 carries a spur gear 85 in mesh with a gear 87 on a shaft 88. The shaft 88 rotates at a speed one-tenth that of the shaft 84. The shafts 84 and 88 have calibrated discs 90 and 91 thereon. The arrangement is such that the disc 91 makes one complete revolution when the lead screw 25 has been turned a sufficient number of times to move the cut-off 12 the full length of its rectilinear travel. During that time the disc 90 makes ten revolutions. The disc 91 may be calibrated in inches and tenths of an inch. The disc 90 is similarly calibrated so that each inch calibration corresponds to a tenth of an inch of travel of the holder 22. If desired the calibration may be in diopters or any other scale. A greater number of multiples may be obtained by a greater number of gears or ratios thereof.

The ring 24 is constructed to receive the cut-off plate 12 in either of two positions at right angles to one another. In one position of the cut-off plate 12 the knife edge thereof is parallel with the apex of the prism 6. In its alternate position the knife edge of the cut-off is at right angles to the apex of the prism 6. In each position the knife edge does not cross the optical axis 14, but is on that axis, being spaced therefrom by an exceedingly minute amount.

Magnetically operated pens or markers 100, 101 and 102 are provided for making records on the discs 73, 90 and 91. These markers are energized by a circuit controlled from the amplifier 18. The arrangement is such that whenever the bridge amplifier 18 is unbalanced there is sufficient current flowing through the coils to maintain the pens or markers out of contact with the record discs 73, 90 and 91. At the instant that the cut-off 12 reaches a position of balance the pens make a mark upon the charts. This thus indicates not only the focal length of the lens 4 but also the angular position in which a balance has been obtained. A manually operable switch 103 is provided for opening the marker circuit. This may be opened during the time the cut-off is being rotated to bring it into proper position with respect to the axis of astigmatism. At that time the signal 16 indicates the presence or absence of a balanced condition of the light cells.

It sometimes happens that a lens to be tested has a very short focal length, in which case it would be necessary to bring the cut-off 12 exceedingly close to the lens 4. Under those conditions the margin of error would be increased. To overcome this difficulty means is provided for moving the light slit 2 closer to the lens 4, by a fixed amount. In this instance I have shown an arrangement whereby the light slit may be moved to a position exactly half as far from the lens 4 from that illustrated in Figure 2. As previously stated, and as illustrated in Figure 4, the slit is mounted to slide upon the rails 21. The slit may occupy the position illustrated in Figures 2 and 3, or it may be pushed a fixed distance to the right. When this is done it is desired to change the ratio of drive between the shaft 81 and the shaft 28. This is automatically accomplished in the following manner: The clutch 77 is actuated by a bell crank 110 pivoted at 111 and including a pin 112 riding in a slot 113 in an arm 114 carried by the sleeve 32. As the sleeve 32 is moved to the right the pin 112 rides in the slot 113 until the sleeve reaches its extreme position at which point the arm 114 pushes the pin 112 to actuate the clutch 77 to disengage the driving connection between the shaft 28 and the gear 77 and to establish a driving connection between this same shaft and the gear 76. The gear 76 drives the same stud shaft 81 as did the gear 75 but at twice the speed. Thus while the cut-off 12 is being adjusted with the light source half as far from the lens the calibration is the same as though the light source were a distance from the lens illustrated in Figure 2 so that the calibrated scales 90 and 91 still read the focal length on that basis.

While in Figures 1 and 2 I have shown a testing system wherein the cut-off moves longitudinally towards the lens, it is to be understood that the cut-off may be stationary and the lens moved towards the cut-off. Likewise, while the focusing system of Figure 1 is one wherein the incident light from the test lens is divergent, this also is not an indispensable part of the present invention, since the incident light may consist of parallel rays, as illustrated in Figure 5. Furthermore, the lens to be tested may consist of a single lens or a group of lenses assembled together. Such an arrangement is illustrated in Figure 5. Insofar as the parts of Figure 5 are the same as those of Figure 1, similar reference numerals have been used. In this instance the light source 1 directs its light through a narrow longitudinal slit 2 in a plate 3 to a lens 120 which directs the light rays into a parallel beam 121 directed to the lens system 4', which system includes a series of lenses the focal point of which is to be ascertained. The lenses are mounted in a suitable holder which is mounted in the test apparatus so that the lens system 4' is movable in a direction parallel to the optical axis 14 of the system. In this instance the cut-off 12 is immovable in a direction longitudinally of the optical axis 14. The light from the light source focuses at 15 which is the cross over point of the pencils of light, and then strikes the reflecting prism 6 as before, from which it is reflected to the light cells 8 and 10 the outputs of which are directed to a balancing bridge type amplifier 18 as heretofore. The system is balanced with the cut-off out of position, at which time both light cells receive the full amounts of light. Thereafter the cut-off is positioned so that its knife edge reaches the optical axis 14 of the system and thus cuts off light from only one of the light cells. Thereafter the lens system 4' is moved in a direction parallel to the optical axis 14 thus moving the focal point 15 of the lens system closer and closer to the cut-off 12. This movement is of no effect on the light cells until the cross over point 15 coincides with the knife edge of the cut-off 12, that is, until the lens is brought into focus on the edge of the cut-off. At this point, and only at this point, the balance of the light cells is reestablished. If the lens 4' is moved too far to the right, so that the light is focused to the right of the cut-off 12, the balance of the outputs of the light cells 8—10 is again destroyed for then the cut-off masks out the light going to the cell 10 rather than to the cell 8. Thus, only at the cross over point is balance established. The establishment of the balance thus indicates that the lens system is in a position such that it focuses the light 15 at the knife edge of the cut-off. The position of the lens system may then be read upon a calibrated scale 125.

If the lens system is astigmatic, the axis of astigmatism must be ascertained as before. The cut-off is positioned so that its knife edge is at right angles to the apex of the prism 6, and then the lens system 4' is rotated about the axis 14 until a position is found where the light cells are balanced. Then the cut-off is positioned with its knife edge parallel to the apex of the prism and the lens system is moved along the axis 14 until a position of balance is again reached, as previously explained.

Figure 6 illustrates, diagrammatically, a physical embodiment of the system of Figure 5. In this system the means for moving the lens system 4' longitudinally of the optical axis 14 comprises a lens holder 126 in which the lens system 4 is mounted, which lens holder is in turn rotatably mounted in a holder 22' through which a lead screw 25' threads. Upon rotation of the lead screw 25' the holder 126 and the lens system 4' is advanced rectilinearly along the optical axis 14. The lead screw 25' may be rotated in any desired manner, as by a worm wheel 130 keyed to the lead screw and rotated by a worm 131 on a shaft 132, which shaft is manually rotated.

Means is provided for rotating the lens system 4' about the optical axis 14 as a center. This means comprises a spur gear 134 which is a part of the holder 126 and which includes a cylindrical portion 135 that is rotatable in the holder 22'. The spur gear 134 meshes with a rotatable pinion shaft 138 that may be rotated in any desired manner as, for instance, by a worm wheel 139 keyed thereto, which is turned by a worm 140 on a hand operated shaft 141. Means, similar to those illustrated in Figure 2, may be provided for reading the angular position of the lens system 4' as well as the accurate electro-magnetic means of Figure 2 for indicating the rectilinear position of the lens when balance is obtained.

In Figure 6 I have shown no means for rotating the reflecting prism 6 with its associated light cells, nor means for rotating the cut-off 12 or the slit plate 3, about the optical axis 14. This may, optionally, be provided, which structure would be the same as is illustrated in Figure 2. The illustration of this structure has been omitted for the sake of simplicity, since that is already illustrated in Figure 2.

In Figure 7 I have illustrated a system wherein a lens or lens system may be tested to determine the focusing characteristics thereof under lights of different wave lengths. In this instance I have shown a testing system such as illustrated in Figure 5 (although it is to be understood that the system may be one such as illustrated in Figure 1), wherein light which passes through the slit 2 is obtained through a light source 1 and a dispersing prism 150. The light source and the prism are mounted on a stand 151 so that the light source together with the prism may be rotated. Light from the source 1 strikes the prism and is broken up into a band 152 ranging from the violet to the red or, if the source emits invisible light also, the range will be from the ultraviolet to the infrared. The plate 3 cuts off all of the light except light of the particular wave length which passes through the slit 2. By rotating the prism 150 it is possible to bring any one of the colors of the spectrum from the prism opposite the slit 2 whereby the testing system tests the focusing characteristics of the lens 4' for light or actinic rays of that particular wave length. Any other means for obtaining monochromatic light may be used.

In the previous descriptions I have described apparatus for ascertaining focal characteristics of lenses of the type which can be placed into the apparatus and which focus light passing through the lens. The principles of the present invention are also applicable to reflecting lenses and to lenses which cannot be placed into the apparatus as, for instance, the lens or fundus of the human eye. An apparatus for testing the focal characteristics and defects in the human eye is illustrated in Figure 8. The apparatus of Figure 8 enables the testing of the human eye to ascertain not only the focusing characteristics of the eye but also to ascertain the astigmatism, if any, and the meridian or axis of astigmatism. A description will first be given of the construction of the apparatus of Figure 8 with a view of ascertaining the focusing characteristics of an eye being tested. The light source is indicated at 1 and directs its light through the slit 2 in the opaque plate 3, thence through the lens 120 from which parallel rays go to a transparent mirror 175. The mirror may be a plain glass plate the opposite surfaces of which are parallel to one another and arranged in a plane at 45° to the incident light. The mirror reflects an image of the slit 2 onto a mirror 178 which is parallel to the mirror 175 so that it directs the image of the slit along the path indicated, to the human eye 179 being tested. The image is focused on the fundus of the eye and reflected back to the mirror 178, thence to and through the mirror 175 to a focusing lens 180 of known focal length, from which the light passes to the reflecting prism 6 that directs the light to the light cells 8 and 10 the outputs of which extend to the bridge amplifier 18, in the manner previously explained. The circuits from the light cells are balanced against one another so that when equal quantities of light strike the two cells the electrical effects produced by the two cells counterbalance one another and the net output of the amplifier is zero. The cut-off 12 is mounted in a ring 24', similar to the ring 24 of Figure 2, which in turn is rotatably mounted in a holder 22a that rides upon the tracks 21 similar to that illustrated in Figure 2. The ring 24' is moved longitudinally by moving the holder 22a by means of a lead screw 25 through a worm wheel 26 actuated by a worm 27 on a shaft 28 which is turned manually to turn the lead screw, all in the same manner as was heretofore explained in connection with Figure 2.

In Figure 8 I have shown the cut-off 12 and the cross over point 15 of the light rays, that is, at the point where the light rays reflected from the fundus of the eye are focused. At this point the cut-off 12 cuts off none of the light from the lens 180 to the prism 6 whereby a balanced condition of the amplifier circuit is maintained. If the cut-off 12 is moved to the right or to the left from the cross over point 15 it will cut off exactly half of the beam of light, whether the movement of the cut-off is in one direction or the other and regardless of the amount of movement. Thus the condition of balance of the light cells is disturbed. It is thus apparent that the balanced condition is obtained only at the cross over point 15 which is a very critical position so that even very slight deviations of the cut-off 12 from this position results in an unbalanced condition.

Means is provided for selectively rotating the slit 2 or the cut-off 12 or the prism 6. This means comprises a hand rotatable shaft 40 driving a worm 41 which drives a worm wheel 42 that turns a shaft 44'. The shaft 44' may be connected to turn the slit plate 3 by a clutch 46 which is actuated by a crank on a manually operated stud shaft 48. The clutch 46 connects the shaft 44' to a pinion 54 in mesh with a spur gear 55 that turns the plate 3. The shaft 44' is also adapted to be connected by the clutch 45 actuated by the hand turned stud shaft 47 to connect the shaft 44' to the pinion shaft 50 which is in mesh with the spur gear 51 on the cut-off carrying ring 24' to turn the cut-off. Likewise the clutch 59 actuated by the crank on the stud shaft 60 is provided for connecting the shaft 44' to the gear 62 that is in mesh with the gear 63 that rotates the casing 35 in which is mounted the prism 6, light cells 8—10 and amplifier 18, all in a manner similar to the means used for producing the rotation of the corresponding parts in the structure of Figure 2. It is important to note that the cut-off 12 and prism 6 rotate about the optical axis 14 as a center and that the slit 3 rotates about the corresponding optical axis 14' as a center.

Means is provided for ascertaining and recording the linear and angular positions of the cut-off at the time balance is obtained. For ascertaining the linear position of the cut-off the lead screw 25 is provided with a worm 185 that drives a worm wheel 186 on a stud shaft 187. The stud shaft carries also a miter gear which is in mesh with a miter gear 190 that drives a shaft 191 which in turn carries a spiral gear 192 in mesh with a spiral gear 193 that rotates a stud shaft 194 that carries a calibrated disc 195. The gear ratio is such that the disc 195 makes one complete revolution for an amount of turning of the lead screw 25 necessary to move the cut-off 12 from one extreme position to the other extreme position.

The means for recording the angular position of the cut-off comprises a worm 200 on the pinion shaft 50, which worm drives a worm wheel 201 that drives a stud shaft 202 that carries a miter gear 203 driving a miter gear 204 which turns a shaft 205 that is coupled with a stud shaft 206 by a pair of miter gears 207—208. The shaft 206 carries a calibrated disc 210. The gearing arrangement is such that the disc 210 makes one revolution for a number of turns of the pinion shaft 50 necessary to turn the cut-off 12 through 360°, although the gearing may be stepped up so that the disc 210 makes one complete turn for one half turn of the cut-off.

Electro-magnetically controlled recording markers 100 and 101 are provided for making a visual impression upon the calibrated discs 195 and 210. These markers are maintained out of position with the calibrated discs or charts 195—210 until a balanced condition is obtained in the amplifier, at which time no current flows through the electro-magnetic coils, and the markers make their marks on the chart. This happens only when the cut-off 12 is at the focal point 15. The charts thus indicate the position of the cut-off when balanced conditions prevail.

In order to permit visual examination of the patient's eye while the focusing characteristics are being obtained, the mirror 178 is provided with a small hole therethrough at 220, and the casing of the apparatus is provided with a similar hole 221, through which the examiner may view the patient's eye and through which the patient may look to concentrate his attention upon an object on the outside of the casing.

In the description of the apparatus of Fig. 8 it was assumed that there is no astigmatic error in the eye being tested. If there is an astigmatic error, and the edge of the cut-off is not in the meridian of astigmatism, it is not possible to obtain the focal length because when the cut-off is at an angle to the meridian of astigmatism the cells 8—10 are balanced in every position of the cut-off on the optical axis. It is therefore necessary to ascertain the meridian of astigmatism. To accomplish this the knife edge of the cut-off is positioned at right angles to the apex of the prism and then the two are rotated together about the optical axis 14. The light cells remain unbalanced until the knife edge of the cut-off reaches a position parallel to an axis of astigmatism, at which position the cells become balanced. The knife edge is then moved through 90° (or the prism 6 is moved through 90°) to bring the prism edge and the knife edge both into parallelism with one of the meridians of astigmatism. Thereafter the cut-off is shifted on the axis 14 to ascertain the focal point in that meridian. The focal point in a meridian at right angles to that meridian may then be ascertained by rotating the prism and the cut-off together through exactly 90° and then shifting the cut-off along the optical axis 14 until a balance of the light cells is obtained.

In each of the embodiments of the present invention above described results are obtained either moving the cut-off towards and away from the lens or by moving the lens towards and away from the cut-off. It is possible to obtain similar results even though the cut-off and the test lens are immovable axially with respect to one another. This is illustrated diagrammatically in Figure 9. In this figure parts similar to those of Figure 1 have been given the same reference numerals. The test lens 4 is at a fixed distance from the slit 2. The cut-off 12 is located between the lens 4 and the slit 2 and is not movable along the optical axis, although it may be rotatable as in the embodiments previously illustrated. In this instance the cut-off 12 cuts off light on one side of the optical axis 14 of the lens so that an unbalanced condition is obtained at the prism. When the prism 6 is in the position illustrated in Figure 9 no light is received by the light cell 10. The prism is movable along the optical axis 14. As the prism moves to the left from the position illustrated in Figure 9, neither of the light cells 8—10 is affected quantitatively by the movement until the prism crosses the cross over point 15. When the prism is to the left of the cross over point 15 the light cell 10, which previously was receiving no light, immediately receives the full quantity of light, and the light cell 8, which previously received the full quantity of light, now receives no light. The balance is again disturbed but in the opposite direction. When the apex of the prism 6 is exactly at the point 14, both light cells receive equal quantities of light. The reestablishment of the balanced conditions thus indicates that the prism has been moved to the point 15.

Instead of moving the prism 6, the prism may also be stationary and the desired result obtained by introducing a movable lens of known focal length between the prism and the cross over point 15 in the system of Figure 9. The lens is positioned so that its optical axis coincides with the optical axis 14. When the lens is in such a position that its focal point does not coincide with the point 15 it will not establish balance of the light cells 8—10. When the lens is moved along the axis 14 until its focal point coincides with the point 15 it will establish balance. This is illustrated in Figure 10 wherein a movable lens 230 is positioned at a distance from the cross over point 15 equal to the focal length of the lens 230. The position of the known lens 230 at which balance is established is thus an indication of the position of the cross point 15 of the unknown lens 4.

In the above description I have spoken of focusing light by a lens for the purpose of testing the lens. The term "light" is used in its broadest sense to include any actinic rays which can be focused by the lens, whether or not the rays are visible to the human eye. Thus, in testing the human eye invisible rays, such as infrared rays, can be used so that dilation of the pupil by the eye is avoided. In testing other lenses one can use infrared rays or ultraviolet rays as may be expedient.

The instrument of the present invention may be used to measure the index of refraction of optical glass. The measurement of the index of refraction of a melt of optical glass, at the present time, generally requires the formation of an optical flat for this purpose. This is an expensive operation. It is possible to measure the index of refraction of a melt of optical glass by measuring the focal length of a lens made from that glass, which lens is of a known thickness and known radius of curvature. The focal length of a lens is determined by three factors, namely, thickness of the lens, the radius of curvature thereof, and the index of refraction of the glass. If a lens is made of a known or measurable radius of curvature and the thickness thereof is measured and then the focal length of that lens is measured in the manner set forth herein, then the index of refraction of the glass may be calculated or charted.

From the above description it is apparent that the test to determine the meridian of astigmatism is independent of the test to determine the focal length. As a result the rotation of the apparatus to determine the meridian of astigmatism is effective regardless of whether or not the apparatus is at a focal or cross-over point of the lens. In certain systems heretofore used for determining the meridian of astigmatism and the focal length of a lens it was necessary to shift the apparatus until a position is reached corresponding to the focal length and the meridian of astigmatism. This means if the meridian of astigmatism is reached when the focal length has not been reached, or vice versa, no indication will be given from which one of the two unknown factors can be ascertained. Since the two unknown factors, namely, the meridian of astigmatism and the focal length are independent of one another, it is exceedingly difficult to strike both the meridian of astigmatism and the focal length at the same time unless one knows when one of the unknown factors has been ascertained so that the search can thereafter be restricted to a search for the other factor. This is possible in accordance with the present invention. It is also apparent, from the above description, that the change from a condition of balance to a condition of unbalance, in the search for the meridian of astigmatism, and the change from a condition of balance in the search for the focal length is a sharp change that takes place critically as the apparatus is moved past the critical points. Thus it is not necessary for the operator to judge the position of the apex of a smooth curve or to judge the position of maximum indication of a signal of gradually varying intensity.

While in the present description I have spoken of rotating the apparatus with respect to the light beam, or rotating the lens to rotate the light beam, it is within the purview of the present invention to use other means for rotating the light beam. For instance, a suitable prism or prisms may be arranged in the light beam, which prisms may be rotated to rotate the light beam from the lens 4 with respect to the prism 6 or with respect to the cut-off 12.

In Figure 1 the cut-off 12 is a control member for controlling the illumination or lack of illumination upon the surfaces 7 and 9 of the prism 6. In Figure 5 the lens 4' is itself the control member for controlling the luminosity upon the different faces of the prism. In the modification illustrated in Figure 9 the prism itself is a control member for controlling the luminosity that is reflected from the surfaces 7 and 9 thereof to the light cells. In the modification illustrated in Figure 10 the known lens 230 is a control member for controlling the luminosity reflected from the surfaces of the prism 6 to the light cells. In each instance the control member is moved to a critical position to bring the control member and the cross-over point 15 of light rays which are converged by the test lens into relationship determined by the focal length of the lens. Also, the control member may comprise the plate 3 in which event the cut-off 12 is not movable along the optical axis 14. Since the focal length of the lens determines the relative relationship of the cross-over point 15 with respect to the distance between the lens and the light slit 2, it is apparent that if the light slit is moved towards or away from the lens 4 the cross-over point 15 is shifted. If now the lens 4 is at a fixed distance from the cut-off 12 and the light slit 2 is moved toward the lens until the cross-over point 15 coincides with the knife edge of the cut-off 12, the distance between the lens 4 and the light source 2 will be a function of the focal length of the lens. The focal length may thus be calibrated or charted in terms of the distance between the light slit 2 and the lens 4.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. Apparatus for testing the focusing characteristics of the human eye, said apparatus comprising means for directing a beam of light to the eye and from the eye to a cross-over point at a location determined by the focusing characteristics of the eye, light responsive means, light control means controlling the light on only one side of the optical axis of the beam of light, movable means for moving the cross-over point and the light control means with respect to one another along the optical axis of the system to change the amount of light directed to the light responsive means as the control means and the cross-over point come to a predetermined position with respect to one another, recording apparatus including two relatively movable cooperating record making members, gearing connecting one of said members for movement with said movable means, and means controlled by the light responsive means in response to the change in the amount of light received thereby as the control means and the cross-over point come into said predetermined position with respect to one another for effecting coaction between said two record making members to record said position.

2. Testing equipment for determining a meridian of astigmatism of the human eye, said equipment comprising means forming an optical system including the eye whose meridian of astigmatism is to be determined, said system including means for directing light to and from the eye so that the cross section of the light beam is altered by the eye in accordance with the astigmatism thereof, means dividing off a quadrant of the light beam by lines of division at right angles to one another and both lines extending through the optical axis of the system, movable means for rotating said dividing means about the optical axis of the system while maintaining the lines of division at right angles to one another, light sensitive means receiving light from said quadrant, recording apparatus including two relatively movable cooperating record making members, gearing connecting one of said members for movement with said movable means, and means controlled by the light sensitive means responsive to changes in light received thereby in different angular positions of the quadrant for causing coaction of said two relatively movable members to make a record of changes in the light received.

3. Means for testing an image forming lens which comprises, a light responsive cell, means for directing a beam of light from the lens to the cell, movable means for causing the cell to receive light only from different limited portions of the area of the lens depending upon the position of the movable means, to vary the light effect on the cell if the lens is astigmatic, recording apparatus, means gearing a part of said recording apparatus for movement with said movable means, and means included in said recording apparatus and cooperating with said part of the recording apparatus and controlled by the light cell for making a record of the position of the movable means at which a variation in the light effect takes place.

4. Means for testing light focusing apparatus comprising means forming an optical system including the light focusing apparatus to be tested, said system including means for directing a beam of light to the apparatus and from the apparatus to a cross-over point at a location determined by the focusing characteristics of the apparatus, light responsive means, light control means controlling the passage of light from the system to the light responsive means, mechanism for moving the cross-over point and the light control means with respect to one another along the optical axis of the system to change the amount of light directed to the light responsive means as the control means and the cross-over point come into a predetermined position with respect to one another, recording apparatus, means gearing a record making part of the recording apparatus for movement together with said mechanism, and electric actuated means controlled by the light responsive apparatus in response to the change in the amount of light received thereby and cooperating with said part of the recording apparatus for controlling a part of the recording apparatus to record the position of the mechanism at which the change in the amount of light occurs.

5. Means for testing light focusing apparatus comprising means forming an optical system including the light focusing apparatus to be tested, said system including means for directing a beam of light to the apparatus and from the apparatus to a cross-over point at a location determined by the focusing characteristics of the apparatus, light responsive means, light control means controlling the passage of light from the system to the light responsive means, mechanism for rotating the light beam and the light control means with respect to one another about the optical axis of the system to change the amount of light directed to the light responsive means as the control means and the light beam come into a predetermined angular relationship with respect to one another, recording apparatus, means gearing a record making part of the recording apparatus for operation together with said mechanism, and said recording apparatus including electric actuated means controlled by the light responsive apparatus in response to predetermined changes in the amount of light received thereby and cooperating with said part of the recording apparatus for controlling a part of the recording apparatus to record the position of the mechanism at which the changes in the amount of light occur.

6. Means for testing an image-forming lens which comprises a light responsive cell, means for directing a beam of light from the lens to the cell, a light control member in the light path, means for moving the control member and the cross-over point of light from the lens with respect to one another along the optical axis of light from the lens to vary the light effect on the cell, recording apparatus a record making part of which is geared to the said last named means, and means controlled by the light cell and cooperating with said part of the recording apparatus for controlling the recording operation of the recording apparatus.

7. Apparatus for testing a focusing optical apparatus which comprises a light responsive device, means for forming an optical system with the apparatus to be tested as a part thereof, said system including means for directing light to the apparatus and then from the apparatus to a cross-over point at a location determined by the focusing characteristics of the apparatus, a control member in the path of the light and controlling the passage of said light to the light responsive member, means for moving the position of the light control member and the cross-over point of the light with respect to one another along the optical axis of the system and producing a change in the light directed to the light responsive member as the cross-over point and the control member come into one predetermined position with respect to one another, a recording member, means for moving a part of the recording member in synchronism with the movement of the relative position of the light control member and the cross-over point of the light with respect to one another, and said recorder including means for making a record of the position of the moving part of the recorder at the instant of a change of light received by the light responsive member.

8. Means for testing an image-forming lens which comprises a light responsive cell, means for directing a beam of light from the lens to the cell, means for relatively rotating the beam and the cell with respect to one another to vary the light effect on the cell if the lens is astigmatic, a light control member in the light path, means for moving the control member and the cross-over point of light from the lens with respect to one another along the optical axis of light from the lens to vary the light effect on the cell, recording apparatus a part of which is geared to the said two last named means, and means controlled by the light cell and cooperating with said part for controlling the recording operation of the recording apparatus.

9. Means for testing light focusing apparatus comprising means forming an optical system including the light focusing apparatus, electrical light responsive means receiving light from the system and responsive to changes in the light received from the system, a movable member controlling the effect of the light system on the light responsive means, means for moving the movable member through a position producing a characteristic change in the output of the light responsive means, recording apparatus a part of which is geared to said movable member so that said part of the recording apparatus moves with the movable member, and means controlled by the light responsive means and cooperating with said part of the recording apparatus for controlling the recording operation of the recording apparatus.

10. Means for testing light focusing apparatus comprising means forming an optical system including the light focusing apparatus to be tested, said system including means for directing a light to the apparatus and from the apparatus to a cross-over point at a location determined by the focusing characteristics of the apparatus, light responsive means, control means controlling the passage of light from the system to a light responsive means, a recorder, means geared to the recorder for moving the cross-over point and the light control means with respect to one another along the optical axis of the system to change the amount of light directed to the light responsive means as the control means and the cross-over point come into a predetermined position with respect to one another, and recorder controlling means controlled by the light responsive apparatus in response to the change in the amount of light received thereby and cooperating with the part of the recorder that is geared to the movable means for causing the recording action of the recorder.

11. Apparatus for testing a focusing optical device comprising a light cell, means for causing the device to direct a beam of light through a cross-over point and then to the cell, a light control member, movable means for moving the cross-over point of the beam and the light control member relatively to one another parallel to the optical axis of the beam to bring the cross-over point of light focused by the device first on one side of the light control member and then on the other side thereof whereby there is a sharp change in the light reaching the light cell when the light control member is at the cross-over point, a recording apparatus, means for moving a part of the recording apparatus in unison with said movable means, and means controlled by the light cell and cooperating with said last mentioned part of the recording apparatus for controlling the effective operation of the recording apparatus in response to the sharp change in the light reaching the light cell.

12. Apparatus for determining optical characteristics of a focusing optical device which comprises a light responsive device, means for directing a beam of light onto said optical device and thence from one side of a plane passing through the axis of said beam of light through a cross-over point to the electric light responsive device, a light interceptor in the beam of light extending to a position up to the axis of the beam to intercept all of the light on only one side of said axis, a recorder, means for moving said interceptor along the optical axis of the beam so that the interceptor passes through the cross-over point of the beam of light and at the same time moving a part of the recording apparatus an amount proportionate to the movement of the interceptor, and means including a part of the recorder for recording the position of the moving part of the recorder at which there is an abrupt change in the output of the light sensitive device.

13. Apparatus for determining optical characteristics of a focusing optical device which comprises two balanced light cells, means for directing a beam of light to said lens and then from said lens to a cross-over point determined by the focusing characteristics of the lens and thence to each of the two balanced light cells from opposite sides of a plane passing through the axis of the beam, a light interceptor in the beam of light and extending up to the axis of the beam so that the interceptor masks out the light on only one side of said plane to upset the balance of the light cells, means for moving the cross-over point of the beam and the interceptor with respect to one another to bring the cross-over point of the light from the lens to the edge of the interceptor to affect equally the light to both cells to reestablish the balance of the effects of the light cells, a recorder, means for moving a portion of the recorder in unison with the movement of the cross-over point of the light with respect to the interceptor, and means including a part of the recorder for making a record on the moving portion of the recorder of the position thereof corresponding to the position of the cross-over point and the interceptor at which reestablishment of the balance of the light cells is obtained.

CHARLES J. GLASSER.